(12) United States Patent
Berkman

(10) Patent No.: US 7,265,664 B2
(45) Date of Patent: Sep. 4, 2007

(54) POWER LINE COMMUNICATIONS SYSTEM AND METHOD

(75) Inventor: William H. Berkman, New York, NY (US)

(73) Assignee: Current Technologies, LLC, Germantown, MD (US)

( * ) Notice: Subject to any disclaimer, the term of this patent is extended or adjusted under 35 U.S.C. 154(b) by 206 days.

(21) Appl. No.: 11/097,132

(22) Filed: Apr. 4, 2005

(65) Prior Publication Data

US 2006/0220833 A1  Oct. 5, 2006

(51) Int. Cl.
G08B 1/08 (2006.01)
H04M 11/04 (2006.01)
H04Q 1/30 (2006.01)

(52) U.S. Cl. .............................. 340/538.16; 340/310.11

(58) Field of Classification Search ........... 340/538.16, 340/310.11, 310.16, 310.17; 370/419, 463; 375/258

See application file for complete search history.

(56) References Cited

U.S. PATENT DOCUMENTS

| | | | |
|---|---|---|---|
| 2,577,731 A | 12/1951 | Berger | |
| 3,656,112 A | 4/1972 | Paull | |
| 3,911,415 A | 10/1975 | Whyte | |
| 3,942,168 A | 3/1976 | Whyte | |
| 3,942,170 A | 3/1976 | Whyte | |
| 3,944,723 A | 3/1976 | Fong | |
| 3,967,264 A | 6/1976 | Whyte et al. | |
| 3,973,087 A | 8/1976 | Fong | |
| 3,973,240 A | 8/1976 | Fong | |
| 4,004,110 A | 1/1977 | Whyte | |
| 4,012,733 A | 3/1977 | Whyte | |
| 4,250,489 A | 2/1981 | Dudash et al. | |
| 4,357,598 A | 11/1982 | Melvin, Jr. | |
| 4,408,186 A | 10/1983 | Howell | |
| 4,475,209 A | 10/1984 | Udren | |
| 4,599,598 A | 7/1986 | Komoda et al. | |
| 4,638,298 A | 1/1987 | Spiro | |
| 4,642,607 A | 2/1987 | Strom et al. | |
| 4,675,648 A | 6/1987 | Roth et al. | |
| 5,272,462 A | 12/1993 | Teyssandier et al. | |
| 5,559,377 A | 9/1996 | Abraham | |
| 5,625,863 A | 4/1997 | Abraham | |

(Continued)

FOREIGN PATENT DOCUMENTS

DE    100 61 584 A1    6/2002

(Continued)

OTHER PUBLICATIONS

"EMETCON Automated Distribution System: Communications Guide", *Westinghouse ABB Power T & D Company Technical Manual 42-6001A.*, (Sep. 1989),1-55.

(Continued)

*Primary Examiner*—John Tweel, Jr.
(74) *Attorney, Agent, or Firm*—Mel Barnes; Capital Legal Group, LLC

(57) ABSTRACT

A power line communications system (PLCS) that provides communications to one or more user devices by repeating data packets on the power distribution network is provided. The PLCS may employ any or all of the MV power line conductors and/or the neutral conductor and be dynamically and remotely transitioned to one of a plurality of potential configurations.

36 Claims, 6 Drawing Sheets

U.S. PATENT DOCUMENTS

| | | | |
|---|---|---|---|
| 5,684,450 | A | 11/1997 | Brown |
| 5,717,685 | A | 2/1998 | Abraham |
| 5,726,980 | A | 3/1998 | Rickard |
| 5,777,769 | A | 7/1998 | Coutinho |
| 5,818,821 | A | 10/1998 | Schurig |
| 5,856,776 | A | 1/1999 | Armstrong et al. |
| 5,870,016 | A | 2/1999 | Shresthe |
| 5,898,904 | A * | 4/1999 | Wang .......................... 370/314 |
| 5,929,750 | A | 7/1999 | Brown |
| 5,933,071 | A | 8/1999 | Brown |
| 5,937,342 | A | 8/1999 | Kline |
| 5,949,327 | A | 9/1999 | Brown |
| 5,952,914 | A | 9/1999 | Wynn |
| 5,978,371 | A | 11/1999 | Mason, Jr. et al. |
| 5,994,998 | A | 11/1999 | Fisher et al. |
| 6,014,386 | A | 1/2000 | Abraham |
| 6,040,759 | A | 3/2000 | Sanderson |
| 6,144,292 | A | 11/2000 | Brown |
| 6,157,292 | A | 12/2000 | Piercy et al. |
| 6,172,597 | B1 | 1/2001 | Brown |
| 7,064,654 | B2 * | 1/2001 | Berkman et al. ...... 340/310.11 |
| 6,275,144 | B1 | 8/2001 | Rumbaugh |
| 6,282,405 | B1 | 8/2001 | Brown |
| 6,300,881 | B1 | 10/2001 | Yee et al. |
| 6,331,814 | B1 | 12/2001 | Albano et al. |
| 6,346,875 | B1 | 2/2002 | Puckette et al. |
| 6,373,377 | B1 | 4/2002 | Sacca et al. |
| 6,396,392 | B1 | 5/2002 | Abraham |
| 6,404,773 | B1 * | 6/2002 | Williams et al. ....... 340/310.11 |
| 6,407,987 | B1 | 6/2002 | Abraham |
| 6,452,482 | B1 | 9/2002 | Cern |
| 6,624,532 | B1 | 9/2003 | Davidow |
| 6,646,447 | B2 | 11/2003 | Cern et al. |
| 6,668,058 | B2 | 12/2003 | Grimes |
| 6,687,574 | B2 | 2/2004 | Pietrowicz et al. |
| 6,844,809 | B2 | 1/2005 | Manis et al. |
| 6,885,674 | B2 | 4/2005 | Hunt et al. |
| 6,922,135 | B2 | 7/2005 | Abraham |
| 6,933,835 | B2 | 8/2005 | Kline |
| 6,950,567 | B2 | 9/2005 | Kline |
| 6,958,680 | B2 | 10/2005 | Kline |
| 6,965,303 | B2 | 11/2005 | Mollenkopf |
| 6,977,578 | B2 | 12/2005 | Kline |
| 6,980,090 | B2 | 12/2005 | Mollenkopf |
| 6,980,091 | B2 | 12/2005 | White et al. |
| 6,985,714 | B2 | 1/2006 | Akiyama et al. |
| 6,993,317 | B2 | 1/2006 | Belsak, Jr. |
| 6,998,962 | B2 | 2/2006 | Cope et al. |
| 7,042,351 | B2 | 5/2006 | Kline |
| 7,046,882 | B2 | 5/2006 | Kline |
| 7,075,414 | B2 | 7/2006 | Giannini et al. |
| 7,098,773 | B2 * | 8/2006 | Berkman ............... 340/310.17 |
| 7,103,240 | B2 | 9/2006 | Kline |
| 7,142,094 | B1 | 11/2006 | Davidow et al. |
| 7,173,935 | B2 | 2/2007 | Lou et al. |
| 7,173,938 | B1 | 2/2007 | Davidow |
| 2001/0054953 | A1 | 12/2001 | Kline |
| 2002/0002040 | A1 | 1/2002 | Kline et al. |
| 2002/0027496 | A1 | 3/2002 | Cern et al. |
| 2002/0097953 | A1 | 7/2002 | Kline |
| 2002/0105413 | A1 | 8/2002 | Cern et al. |
| 2002/0109585 | A1 | 8/2002 | Sanderson |
| 2002/0110310 | A1 | 8/2002 | Kline |
| 2002/0110311 | A1 | 8/2002 | Kline |
| 2002/0118101 | A1 | 8/2002 | Kline |
| 2002/0121963 | A1 | 9/2002 | Kline |
| 2002/0154000 | A1 | 10/2002 | Kline |
| 2003/0039257 | A1 | 2/2003 | Manis |
| 2003/0054793 | A1 | 3/2003 | Manis et al. |
| 2003/0160684 | A1 | 8/2003 | Cern |
| 2003/0169155 | A1 | 9/2003 | Mollenkopf et al. |
| 2003/0224784 | A1 | 12/2003 | Hunt et al. |
| 2003/0227373 | A1 | 12/2003 | Lou et al. |
| 2004/0056734 | A1 | 3/2004 | Davidow |
| 2004/0067745 | A1 | 4/2004 | Belsak |
| 2004/0083066 | A1 | 4/2004 | Hayes et al. |
| 2004/0110483 | A1 | 6/2004 | Mollenkopf |
| 2004/0113756 | A1 | 6/2004 | Mollenkopf |
| 2004/0113757 | A1 | 6/2004 | White, II et al. |
| 2004/0135676 | A1 | 7/2004 | Berkman et al. |
| 2004/0157551 | A1 | 8/2004 | Gainey et al. |
| 2004/0163128 | A1 | 8/2004 | Phillips et al. |
| 2004/0168199 | A1 | 8/2004 | Phillips et al. |
| 2004/0223617 | A1 | 11/2004 | Corcoran et al. |
| 2004/0227621 | A1 | 11/2004 | Cope et al. |
| 2004/0227622 | A1 | 11/2004 | Giannini et al. |
| 2004/0242185 | A1 | 12/2004 | Lee |
| 2005/0040809 | A1 | 2/2005 | Uber, III et al. |
| 2005/0046550 | A1 | 3/2005 | Crenshaw et al. |
| 2005/0068223 | A1 | 3/2005 | Vavik |
| 2005/0111533 | A1 | 5/2005 | Berkman |
| 2005/0128057 | A1 | 6/2005 | Mansfield et al. |
| 2005/0168326 | A1 | 8/2005 | White et al. |
| 2005/0200459 | A1 | 9/2005 | White, II |
| 2005/0220004 | A1 | 10/2005 | Vollmer et al. |
| 2005/0285720 | A1 | 12/2005 | Cope et al. |
| 2006/0044076 | A1 | 3/2006 | Law |
| 2006/0045105 | A1 | 3/2006 | Dobosz et al. |
| 2006/0049693 | A1 | 3/2006 | Abraham et al. |
| 2006/0073805 | A1 | 4/2006 | Zumkeller et al. |
| 2006/0079198 | A1 | 4/2006 | Sanderson |
| 2006/0082219 | A1 | 4/2006 | Gerszberg et al. |
| 2006/0097573 | A1 | 5/2006 | Gidge et al. |
| 2006/0146866 | A1 | 7/2006 | Stephan et al. |
| 2006/0220833 | A1 | 10/2006 | Berkman |
| 2006/0221995 | A1 | 10/2006 | Berkman |
| 2006/0291575 | A1 | 12/2006 | Berkman |

FOREIGN PATENT DOCUMENTS

| | | |
|---|---|---|
| EP | 0 470 185 B1 | 11/1995 |
| EP | 0 913 955 A2 | 5/1999 |
| EP | 1 217 760 A1 | 6/2002 |
| EP | 1 251 646 A2 | 10/2002 |
| GB | 2 293 950 A | 4/1996 |
| JP | 10200544 A2 | 7/1998 |
| WO | WO-03/30396 A2 | 4/2003 |
| WO | WO-03/039022 A1 | 5/2003 |
| WO | WO 2004102868 | 11/2004 |

OTHER PUBLICATIONS

"Outlook Conference 2004: Amperion Deployment Overview", *Primen Conference*, (May 7, 2004),1-10.

"White Paper on Medium Voltage Powerline Communication (PLC) Networks", *CIGRE SC D2 WG 14, Broadband PLC*, (Mar. 2005),1-58.

Barstow, J M., "A Carrier Telephone System for Rural Service", *AIEE Transactions*, (1947),301-307.

Dostert, K , "EMC Aspects of High Speed Powerline Communications", *Proceedings of the 15th International Wroclaw Symposium and Exhibition on Electromagnetic Capability*, (Jun. 27-30, 2000),98-102.

Dostert, K, "Powerline Communications, Ch. 5", *Powerline Communications*, (2001),286, 288-292.

Feduschak, N A., "Waiting in the Wings: Is Powerline Technology Ready to Compete with Cable?", www.cabletoday.com/ic2/archives/0301/0301powerline.htm, (Mar. 2001),1-5.

Horiguchi, Akira, "High Speed Power Line Communication Technology", *Mitsubishi Electric Advance* vol. 109, (Mar. 2005),1-27.

Jee, G, et al., "Demonstration of the Technical Viability of PLC Systems on Medium- and Low-Voltage Lines in the United States", *IEEE Communication Magazine*, (May 2003),108-112.

* cited by examiner

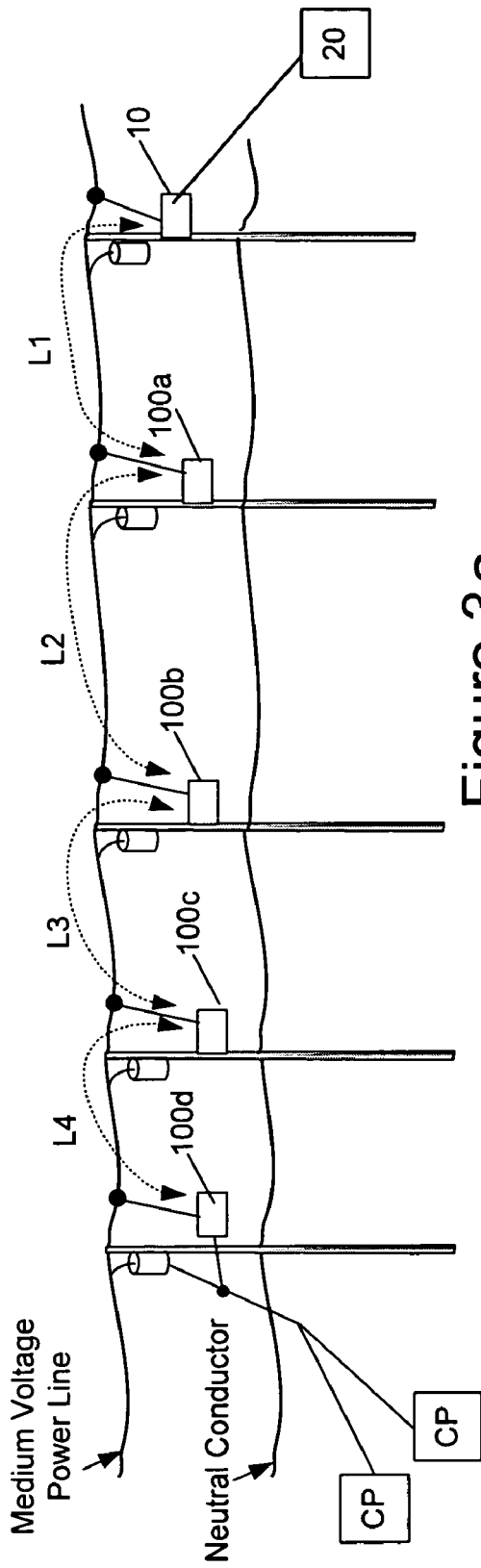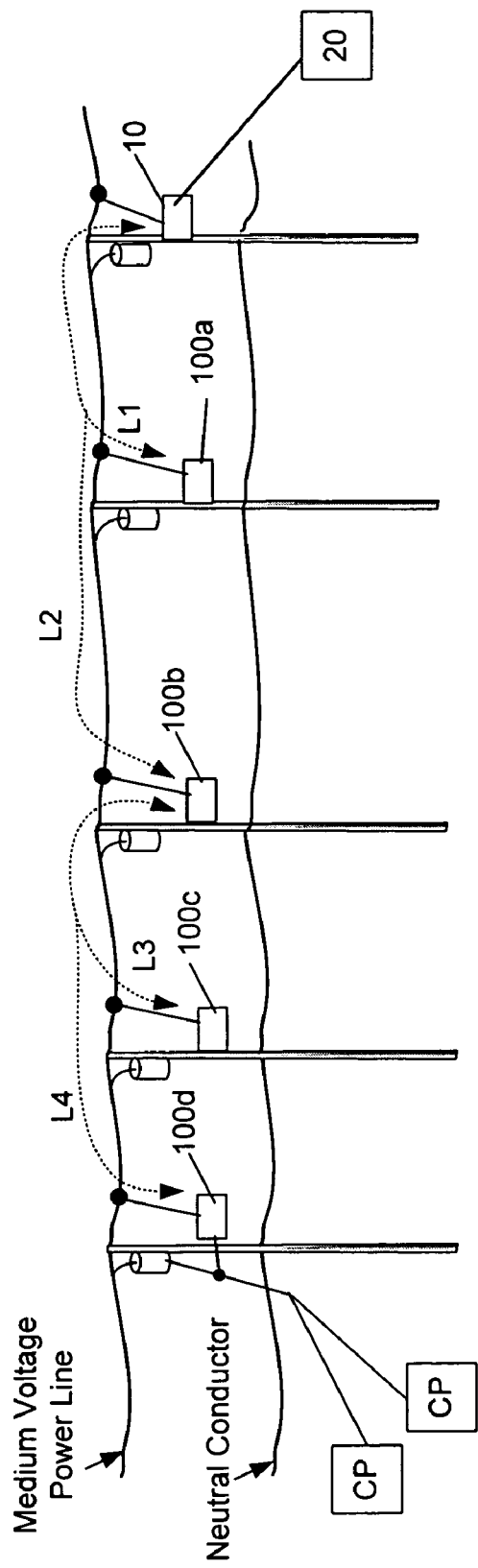

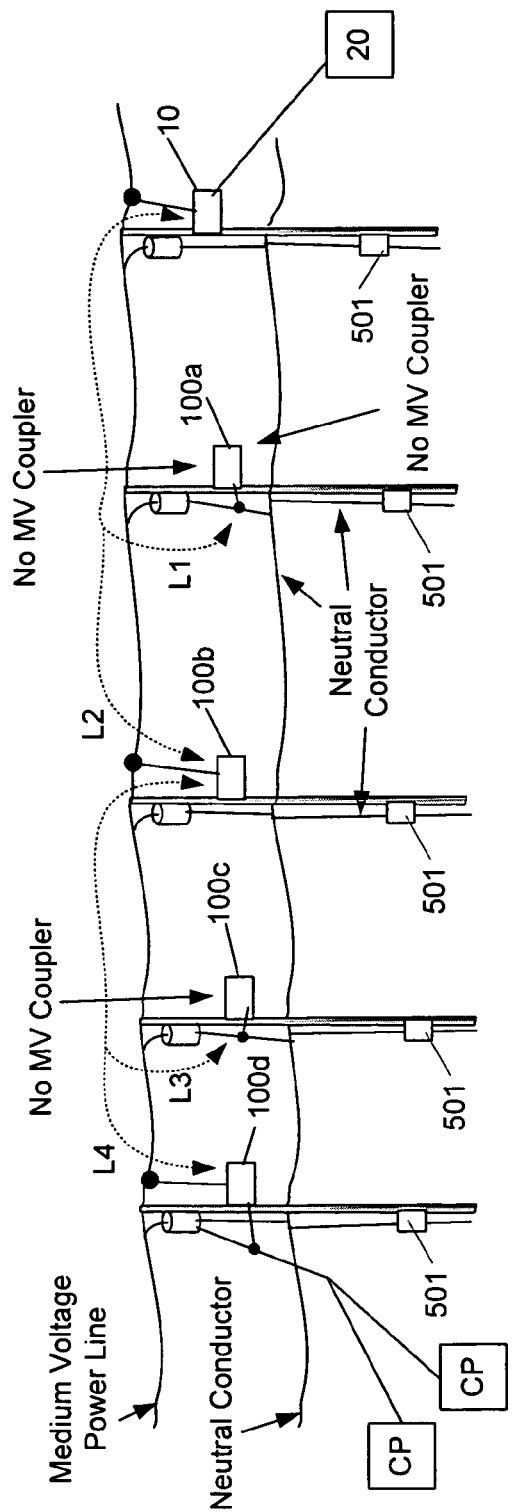
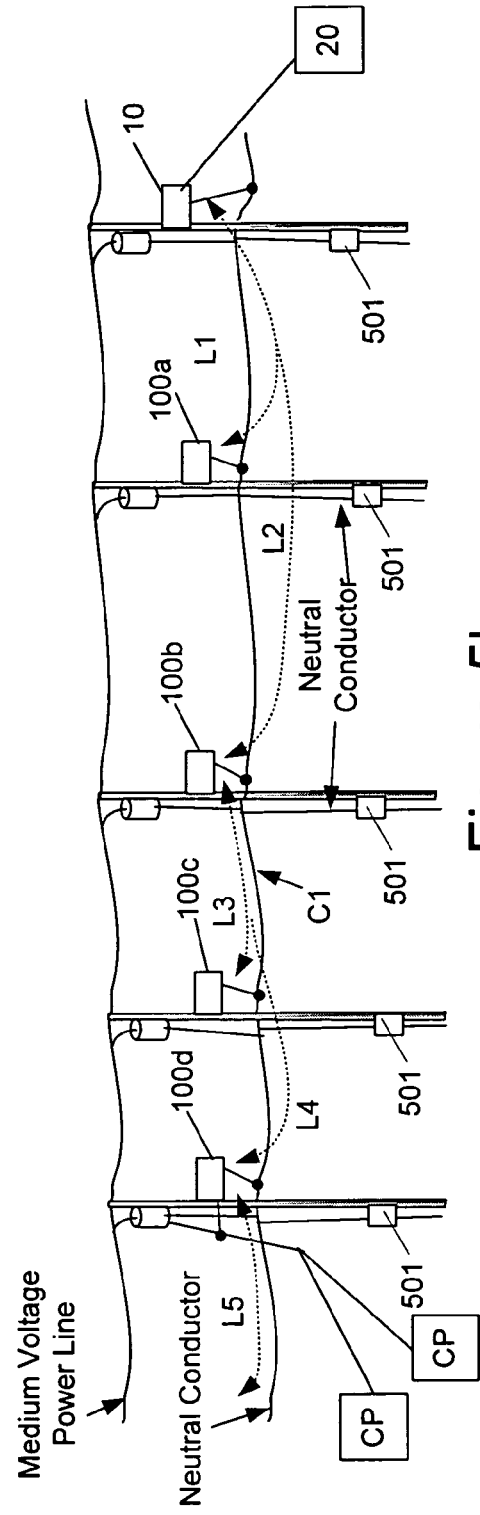
Figure 5a
Figure 5b

POWER LINE COMMUNICATIONS SYSTEM AND METHOD

FIELD OF THE INVENTION

The present invention generally relates to data communications over a power distribution system and more particularly, to a system that employs repeating communications over power line conductors and a method of using the same.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines that already have been run to many homes and offices, can be used to carry data signals to and from the homes and offices. These data signals are communicated on and off the power lines at various points in the power line communication system, such as, for example, near homes, offices, Internet service providers, and the like.

While the concept may sound simple, there are many challenges to overcome in order to use power lines for data communication. Overhead power lines are not designed to provide high speed data communications and are very susceptible to interference. Additionally, federal regulations limit the amount of radiated energy of a power line communication system, which therefore limits the strength of the data signal that can be injected onto power lines (especially overhead power lines). Consequently, due to the attenuation of the communications signals caused by the power lines, communications signals typically will travel only a relatively short distance on power lines. In addition, the distance may vary from location to location.

Power system transformers are one obstacle to using power distribution lines for data communication. Transformers act as a low-pass filter, passing the low frequency (e.g., the 50 or 60 Hz) power signals and impeding the high frequency signals (e.g., frequencies typically used for broadband data communication). As such, power line communication systems face the challenge of communicating the data signals around, or through, the distribution transformers.

In addition, power lines are susceptible to ingress noise, which may vary from location to location. As a result, layout and network planning of a power line communications system may be difficult due to the unpredictability of the power line communications channels. In addition, one of the more expensive aspects of the power line communications systems is installing backhaul media, such as fiber optic cables or wireless networks, to provide a backhaul link between a portion of the PLCS and a conventional network connection (e.g., a point of presence or POP). Thus, there is a need for a power line communications system and method that can reduce the need for backhaul media and extend the communication range of network elements, while reliably and economically servicing customers. These and other advantages may be provided by various embodiments of the present invention.

SUMMARY OF THE INVENTION

The present invention provides a PLCS that provides communications to one or more user devices by repeating data on the electrical power distribution network. The PLCS may employ any or all of the MV power line conductors and/or the neutral conductor and be dynamically and remotely transitioned to one of a plurality of potential configurations.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIGS. 3a-b are schematic representations of a portion of example power line communications systems in accordance with example embodiments of the present invention;

FIGS. 5a-b are schematic representations of a portion of example power line communications systems in accordance with further example embodiments of the present invention.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, electrical distribution power networks, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, couplers, bypass devices, backhaul devices, backhaul links, operating systems, development interfaces, and hardware are omitted so as not to obscure the description of the present invention.

System Architecture and General Design Concepts

Figure 1:
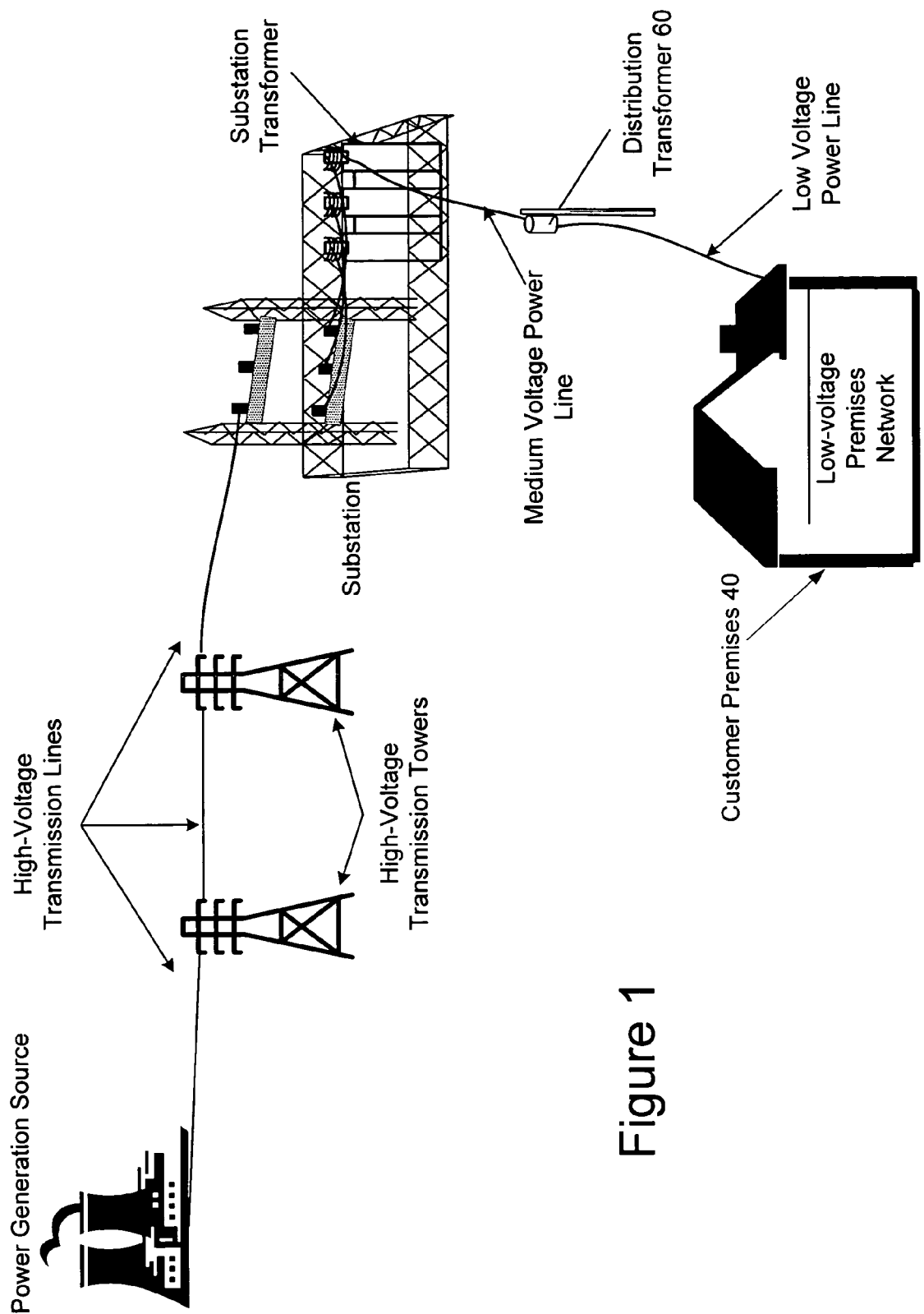
FIG. 1 is a diagram of an exemplary power distribution system with which the present invention may be employed.

As shown in FIG. 1, power distribution systems typically include components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include MV power lines and LV power lines. As discussed, MV typically ranges from about 1000 V to about 100 kV and LV typically ranges from about 100 V to about 240 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase voltages to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

The PLCS of the present invention may communicate signals to and from communication devices at the customer premises through the LV power line, wirelessly, or via other means. In addition, the PLCS may communicate enhanced power distribution service (EPDS) data such as automated meter reading power usage data.

Power Line Communication System

Figure 2:
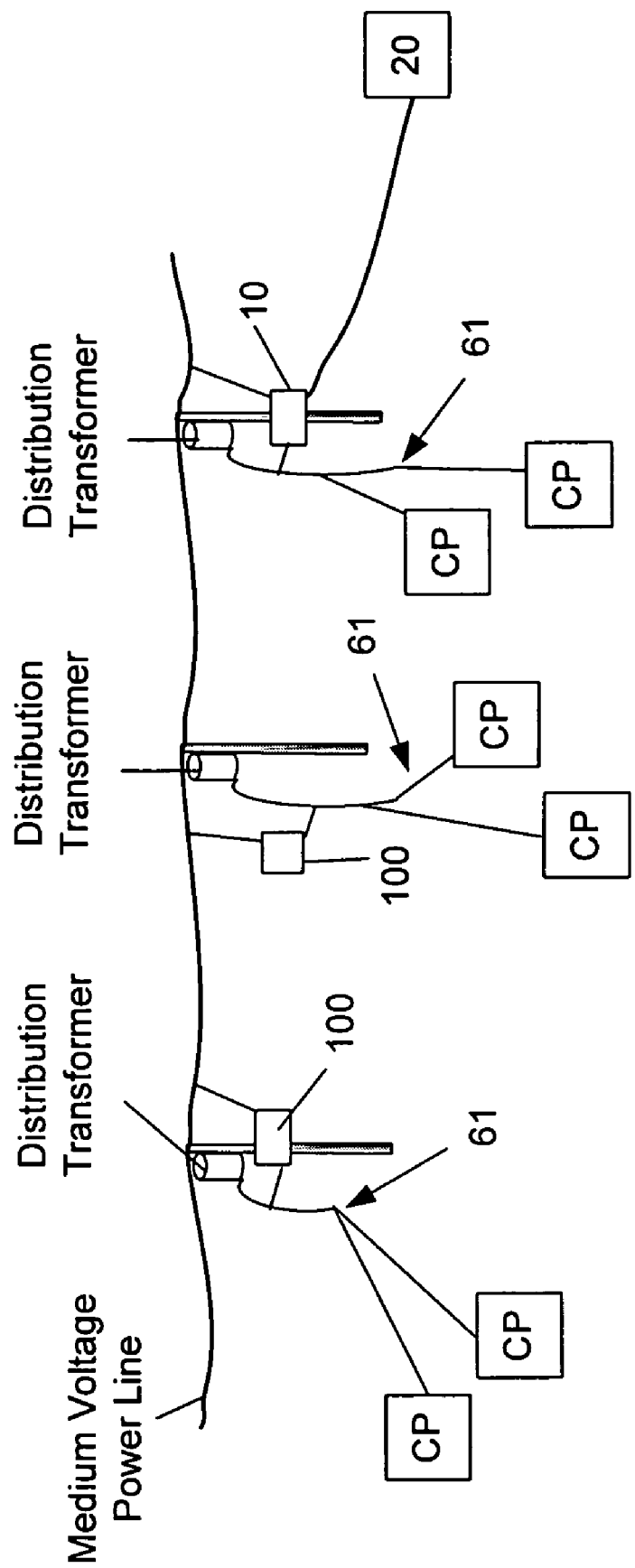
FIG. 2 is a diagram of a portion of an example power line communications system.

One example of portion of such a PLCS is shown in FIG. 2 and includes one or more bypass devices 100. This example embodiment of the present invention may employ a bypass device (BD) 100 to communicate data signals past the distribution transformer (e.g., either around or through the transformer). Thus, the BD 100 may act as the gateway between the LV power line subnet (i.e., the devices that are communicatively coupled to the LV power lines) and the MV power line and communicates signals to and from user devices at the customer premises (CP) via the low voltage subnet 61.

In this embodiment, the BD 100 provides communication services for the user, which may include security management, routing of Internet Protocol (IP) packets, filtering data, access control, service level monitoring, signal processing and modulation/demodulation of signals transmitted over the power lines.

This example portion of a PLCS also includes a backhaul point 10. The backhaul point 10 is an interface and gateway between a portion of a PLCS (e.g., an MV run) and a traditional non-power line telecommunications network. One or more backhaul points (BP) 10 are communicatively coupled to an aggregation point (AP) 20 that in many embodiments may be at (e.g., co-located with), or connected to, the point of presence (POP) to the Internet. The BP 10 may be connected to the AP 20 using any available mechanism, including fiber optic conductors, T-carrier, Synchronous Optical Network (SONET), or wireless techniques well known to those skilled in the art. Thus, the BP 10 may include a transceiver suited for communicating through the communication medium.

The AP 20 may include a conventional Internet Protocol (IP) data packet router and may be directly connected to an Internet backbone thereby providing access to the Internet. Alternatively, the AP 20 may be connected to a core router (not shown), which provides access to the Internet, or other communication network. Depending on the configuration of the PLCS, a plurality of APs 20 may be connected to a single core router which provides Internet access. The core router (or AP 20 as the case may be) may route voice traffic to and from a voice service provider and route Internet traffic to and from an Internet service provider and/or video provider. The routing of packets to the appropriate provider may be determined by any suitable means such as by including information in the data packets to determine whether a packet is voice. If the packet is voice, the packet may be routed to the voice service provider and, if not, the packet may be routed to the Internet service provider. Similarly, the packet may include information (which may be a portion of the address) to determine whether a packet is Internet data. If the packet is Internet data, the packet may be routed to the Internet service provider and, if not, the packet may be routed to the voice service provider. Additionally, if the packet includes voice, video or other time sensitive data, it may be accorded a higher priority to thereby reduce the latency thereof.

In some PLCS embodiments, there may a distribution point (not shown) between the BP 10 and the AP 20. The distribution point, which include a router, may be coupled to a plurality of BPs 10 and provides routing functions between its BPs 10 and its AP 20. In one example embodiment, a plurality of BPs 10 are connected to each distribution point and each distribution point (of which there are a plurality) is coupled to the AP 20, which provides access to the Internet.

The PLCS also may include a power line server (PLS) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote network operations center (NOC), and/or at a PLCS Point of Presence (POP), to oversee a group of communication devices via the Internet. The PLS may provide an Internet identity to the network devices by assigning the devices (e.g., user devices, BDs 100, (e.g., the LV modems and MV modems of BDs), BPs 10, and AP 20) IP addresses and storing the IP addresses and other device identifying information (e.g., the device's location, address, serial number, etc.) in its memory. In addition, the PLS may approve or deny user devices authorization requests, command status reports, statistics and measurements from the BDs, and BPs, and provide application software upgrades to the communication devices (e.g., BDs, BPs, and other devices). The PLS, by collecting electric power distribution information and interfacing with utilities' back-end computer systems may provide enhanced power distribution services such as automated meter reading, outage detection, restoration detection, load balancing, distribution automation, Volt/Volt-Amp Reactance (Volt/VAr) management, and other similar functions. The PLS also may be connected to one or more APs and/or core routers directly or through the Internet and therefore can communicate with any of the BDs, user devices, and BPs through the respective AP and/or core router.

The PLCS may further include indoor low voltage repeaters and outdoor low voltage repeaters (not shown). Indoor low voltage repeaters may be plugged into a wall socket inside the customer premises. Outdoor low voltage repeaters may be coupled to the external low voltage power line conductors extending from the transformer and therefore, be located between the customer premises and the BD 100. Both the indoor low voltage repeaters and outdoor low voltage repeaters repeat data on the low voltage power line to extend the communication range of the BD 100 and power line modem(s) at the customer premises.

At the user end of the PLCS of this example system, data flow originates from a user device, which provides the data to a power line modem (PLM) 50, which is well-known in the art.

Various electrical circuits within the customer's premises distribute LV power and data signals within the customer premises. The customer draws power on demand by plugging a device into a power outlet. In a similar manner, the customer may plug the PLM into a power outlet to digitally connect user devices to communicate data signals carried by the LV wiring. The PLM thus serves as an interface for user devices to access the PLCS. The PLM can have a variety of interfaces for customer data appliances. For example, a PLM can include a RJ-11 Plain Old Telephone Service (POTS) connector, an RS-232 connector, a USB connector, a Ethernet 10 Base-T connector, RJ-45 connector, and the like. In this manner, a customer can connect a variety of user devices to the PLCS. Further, multiple PLMs can be plugged into power outlets throughout the customer premises, with each PLM communicating over the same wiring internal of the customer premises to the BD 100.

The user device connected to the PLM may be any device capable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device (which may be a digital video recorder), a home network device, a utility meter, or other device. The PLM transmits the data received from the user device through the LV power lines to a BD 100 and provides data received from the LV power line to the user device. The PLM may also be integrated with the user device, which may be a computer. In addition, the functions of the PLM may be integrated into a smart utility meter such as a gas meter, electric meter, water meter, or other utility meter to thereby provide automated meter reading (AMR).

The BD 100 typically transmits the data to (and receives the data from) the backhaul point 10, which, in turn, transmits the data to (and receives the data from) the AP 20. The AP 20 then transmits the data to (and receives the data from) the appropriate destination (perhaps via a core router), which may be a network destination (such as an Internet address) in which case the packets are transmitted to, and pass through, numerous routers (herein routers are meant to include both network routers and switches) in order to arrive at the desired destination.

If the BP 10 and a BD 100 are too far apart (along the MV power line), noise and attenuation of the communications signals transmitted over the power line(s) may prevent reliable communications between the two devices. Thus, the PLCS may have a maximum communications distance (MCD) (along the MV power line) over which a BP 10 and a BD 100 may communicate reliably. In addition, this distance may vary from location to location (e.g., from street to street), which makes planning the PLCS network difficult. If, after installation, a communication link between a BD 100 and its BP 10 is unreliable, one option is to install a second BP 10 closer to the BD 100 to service the BD 100. However, installation of BPs 10 can be costly due to costs of installation time, equipment, and the necessity of providing a backhaul link, which may require installing a fiber optic cable or wireless backhaul link.

In addition to the above, due to noise and other factors the communications link between a BD 100 and its BP 10 may be reliable at times and unreliable at other times and/or may become unreliable sometime after installation of the network. Again, one solution is to install a new BP 10 closer to the BD 100 for communications, to service the BD 100. However, as discussed above, this solution is costly. Another solution to the problem is to install a dedicated repeater between the BP 10 and the BD 100. However, typically this requires sending personnel to perform the installation of the repeater (i.e., a truck roll), which can be costly and can take days or weeks to complete during which time the subscriber of the PLCS service may be without reliable service or without any service.

The present invention may reduce the need to install additional BPs, backhaul links, and dedicated repeater devices by extending the reach of existing BPs beyond the MCD through the use of existing network elements.

Examples of BDs 100, BPs 10 and other PLCS components are provided in U.S. patent application Ser. No. 11/091,677, entitled "Power Line Repeater System and Method," filed Mar. 28, 2005, which is hereby incorporated by reference in its entirety.

Example Embodiment

Overview

This example embodiment of the present invention may employ a BD 100 that provides communications to one or more user devices (e.g., via the LV power lines, wirelessly, via a coaxial cable, via a fiber optic link, via a twisted pair, or other suitable manner) that also can be configured to repeat communications for other network elements over a power line conductor (MV conductor or neutral conductor). Each BD 100 may be communicatively coupled to a BP 10 via an upstream link (which may also include other repeating network elements) and receive commands through the upstream link. Thus, the PLS may transmit a command to the BD 100 to enable or disable repeating along with configuration information that allows the BD 100 to determine what data is to be repeated (e.g., the address information of the devices for which the BD 100 is to repeat communications). A detailed description of a dynamically and remotely configuration repeating BD 100 is provided in the incorporated application.

In one example embodiment, the network elements devices may communicate with each other via a daisy-chained communications scheme. FIG. 3*a* illustrates a first example embodiment of the present invention. In this embodiment, each BD 100 may receive data and transmit the data back on the MV power line for reception by the adjacent BD 100. As will be evident to those skilled in the art, the BDs 100 of FIG. 3*a* may be communicatively coupled to one or more user devices at the customer premises via a user communications link, For ease of illustration, the user communications link and CP are shown in FIG. 3*a* and subsequent figures only for BD 100*d*, which in this embodiment is a low voltage power line link. In practice, many, if not all, of the BDs 100*a-d* may be communicatively coupled to one or more user devices by a user communications link, which may be one or more of a fiber optic link, a wireless link, coaxial cable link, twisted pair link, LV power line link, or other suitable link.

In this example embodiment, for downstream communications (i.e., toward the subscriber) backhaul point 10 may transmit a first data packet in a first signal over the MV power line. The first signal may traverse link L1 and be received by BD 100*a*. If the data packet is addressed to one of the user devices (not shown) for which BD 100*a* provides communications via its user communications link, BD 100*a* may transmit the packet to the user device (e.g., via the low voltage power line, wirelessly, via a coax cable, via a fiber optic, via twisted pair, or in another manner as the case may be). If the data packet is addressed to the BD 100*a* itself, BD 100*a* may process the packet as a command or request from the PLS. If the data packet is addressed to one of the BDs 100 for which BD 100*a* provides communications (i.e., repeats), BD 100*a* may demodulate, re-address, and retransmit the data onto the MV power line in a second data packet embodied in a second signal. The data included in the second data packet may include the same data payload received in the first data packet, but may have a different destination address (e.g., media access control (MAC) address) and source address inserted by BD 100*a*. BD 100*a*, and the other devices described herein, may use a routing table (e.g., an Address Resolution Protocol (ARP) table) to determine (1) the addresses (e.g., MAC or IP addresses) of devices for which the BD 100 should repeat, (2) addresses for user devices it services (e.g., MAC or IP addresses), and (3) the addresses (e.g., MAC address) that should be included as the destination address for each (e.g., user packet or BD 100 packet). In this example, the BD 100*a* may insert the MAC address of BD 100*b* as the destination address and transmit the second data packet onto the MV power line, which may traverse links L1 and L2. Both the backhaul point 10 and BD 100*b* may receive the second data packet transmitted from BD 100*a*. However, after demodulation and processing of the signal, backhaul point 10 may ignore the second data packet because, for example, the destination address of the second packet may not correspond to the address of backhaul point 10, but instead correspond to the address of the BD 100*b*. As will be evident to those skilled in the art, those devices (e.g., BDs 100 and BP 10) that receive packets without appropriate addressing typically will ignore or discard the data packet. However, for ease of discussion, the demodulation, address comparison, and ignoring or discarding of such data packets may not always be repeated throughout the discussion herein. BD 100*b* may receive, demodulate, process, re-address (if necessary), modulate, and re-transmit the data (hereinafter collectively referred to as "repeat the data") on to the MV power line in a third data packet in a third signal that may traverse links L3 and L2.

Similarly, BD 100*a* may ignore the third data packet and BD 100*c* may repeat the data in a fourth data packet in a fourth signal for reception by BD 100*d* via link L4, which may further repeat the data in a fifth data packet in a fifth signal for reception by another BD 100 (not shown). Additionally, and as discussed above, BDs 100*b-d* also may process the data as a command or transmit the data to a user device if the data packet is address appropriately.

The devices, such as BD 100*d*, may need to transmit upstream data. In the embodiments described herein, upstream data may include data transmitted to a BD 100 or backhaul point 10 from another BD 100 further downstream. In addition, upstream data may include data received by the BD 100 or backhaul point 10 from one or more user devices (not shown in FIG. 3*a*) (hereinafter "user data"), including, but not limited to, data transmitted wirelessly, via the low voltage power lines, via a coaxial cable, via a fiber optic cable, via a coaxial cable, via a twisted pair, via surface wave, and/or via any other means or medium of transmission. Additionally, upstream data may include control data, which may be data originating from a BD 100 or backhaul point 10 such as in response to a request or command from the PLS, transmission of an alert or notification, transmission of measurement data (e.g., low voltage measurement, medium voltage measurement, temperature, etc.) or other data.

Referring to FIG. 3*a*, BD 100*d* may transmit or repeat upstream data in a first upstream data packet via link L4 for reception by BD 100*c*. Likewise, BD 100*c*, 100*b*, and 100*a*, may repeat the upstream data via links L3, L2, and L1, respectively. Upon reception of properly address upstream data, backhaul point 10 may repeat the data onto the backhaul link for eventual reception by AP 20. As will be evident to those skilled in the art, BD 100*c*, BD 100*b*, and BD 100*a* also may originate and transmit upstream control data and user data, which may be repeated by any upstream BDs 100 disposed between the originating BD 100 and BP 10.

FIG. 3*b* illustrates a second embodiment of the present invention. In this embodiment, some of the BDs 100 may repeat the data that they receive, while others do not. For example, for downstream communications (i.e., toward the subscriber) backhaul point 10 may receive data from AP 20 via the backhaul link and transmit that data in a first data packet in a first signal over the MV power line. The first signal may traverse links L1 and L2 and be received by BDs 100*a* and 100*b*, which may receive, demodulate the data packet. BD 100*a* may process the packet as a command or transmit the data to a subscriber if the packet is appropriately addressed to BD 100*a*. If the data packet is not appropriately addressed to BD 100*a*, BD 100*a* may ignore the packet.

BD 100*b* may process the packet as a command, ignore the data, or transmit the data to a subscriber if the packet is appropriately addressed to BD 100*b*. Additionally, if the destination address of the packet matches a destination in the routing table, BD 100*b* may re-address and retransmit (i.e., repeat) the data onto the MV power line in a second data packet embodied in a second signal. The second signal may traverse links L3 and L4 and be received by BDs 100*c* and 100*d*, which may receive and demodulate the data packet.

BD 100*c* may process the packet as a command or transmit the data to a subscriber if the data packet is appropriately addressed to BD 100*c*. If the data packet is not appropriately addressed to BD 100*c*, BD 100*c* may ignore the data. BD 100*d* also may process the data as a command, transmit the data to a subscriber if the packet is appropriately addressed to BD 10*d*, or ignore the data if not appropriately addressed. In addition, if the destination address of the data packet matches a destination address in its routing table, BD 100*d* may re-address and retransmit (i.e., repeat) the data onto the MV power line in a third data packet embodied in a third signal, for reception of other BDs 100 further downstream (not shown).

As discussed above, those BDs 100 and the backhaul point 10 that receive packets that do not have the appropriate destination address may ignore by the data packets.

For upstream communications, BD 100*d* may transmit or repeat upstream in a first upstream data packet, which may be received by BDs 100*c* and 100*b*. BD 100*c* may ignore the data packet while BD 100*b* may repeat the data for reception by backhaul point 10. Upon reception of a properly addressed upstream data packet, backhaul point 10 may transmit the data onto the backhaul link for eventual reception by AP 20.

While in the example embodiment of FIG. 3*b* every other BD 100 repeats data, other systems may repeat the data at every third, fourth, fifth, sixth, seventh, eighth, ninth, tenth, or other incremental BD 100. Likewise, in other systems, some portion(s) of the PLCS network connected to a BP 10 (BDs 100 on portions of an MV run) may repeat the data at every other BD 10 and other portion(s) may repeat the data at the third, fourth, fifth, sixth, seventh, eighth, ninth, tenth and/or other incremental BD 100. In other words, the distance between the repeating BDs 100 and the number of non-repeating BDs 100 between repeating BDs 100 may not be consistent throughout the PLCS or over an MV run. Similarly, the distance between the repeating BDs 100 and the number of non-repeating BDs 100 between repeating BDs 100 may not be constant and may be dynamically changed such as, for example, by commands transmitted from the PLS over the power lines. For example, if network conditions permit, it may be desirable to reduce the number of repeats to a given network element (BD 100) so as to reduce the latency of data and/or increase the available bandwidth for data communicated with that network element.

It has been discovered that an increase in humidity may reduce power line noise in some areas, thereby permitting a reduction in the number of repeats for a device during certain times of the year such as in the summer months. Also, certain types of data may follow a different data path than others. For example, it may be desirable to repeat EPDS data from a given network element more than voice data from that network element because the EPDS data is not time sensitive while significant latency of voice data may be undesirable. Thus, the BDs 100 may have different routing table or rules for different types of data. Additionally, for data being repeated more, the power levels of the transmitter may be dynamically reduced (in comparison to data be repeated less) because the data may need to go a comparatively shorter distance. The power reduction may allow the data to be communicated a shorter distance thereby by allowing more reuse of the MV power line as a communications channel. For example, referring to FIG. 3*a*, BP 10 may be transmitting a first data packet in a first signal onto the MV power line while BD 100*c* is simultaneously, or prior to the complete reception of the first data packet, transmitting another data packet in a second signal (i.e., the signals can be transmitted during overlapping time periods). Provided the power levels of the transmitters are appropriately set or controlled (e.g., set sufficiently low so that the signal may travel only to the adjacent transformer), neither signal will interfere with the other because no BD 100 (in this example) is positioned to receive both signals. Thus, through strategic placement of devices and selection of power levels, the MV power line channel (and neutral conductor) may be used to communicate multiple signals in the same frequency band simultaneously and/or in overlapping time periods.

Likewise, while in the example embodiment of FIG. 3*b* the same BD 100 repeats data packets for both upstream and for downstream communications, other embodiments may include some BDs 100 that repeat only downstream data and others that repeat only upstream data, (which may use different frequency bands). In addition, the upstream data and downstream data may be communicated via different communications schemes. For example, downstream data may be communicated via the embodiment of FIG. 3*b*, and the upstream data may be communicated via the embodiment shown in FIG. 3*a* (e.g., every device repeats).

Figure 4A:
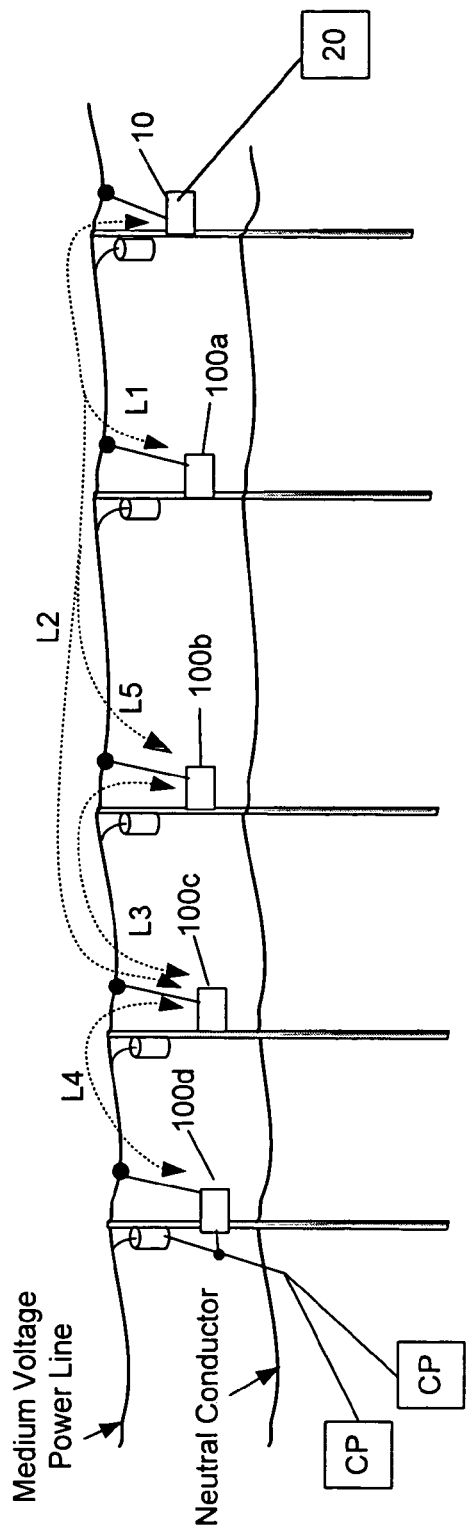
FIGS. 4a-b are schematic representations of a portion of example power line communications systems in accordance with other example embodiments of the present invention.

FIG. 4*a* illustrates a third embodiment of the present invention. In this embodiment, BD 100*c* may repeat data for both an "upstream" BD 100*b* (i.e., is located between BD 100*c* and the BP 10) and a downstream BD 100*d* (i.e., is not located between BD 100*c* and the BP 10). For example, for downstream communications (i.e., toward the subscriber) backhaul point 10 may receive data via the backhaul link and transmit that data in a first data packet in a first signal over the MV power line. The first signal may traverse link L1, L2, and L5 and be received by BDs 100*a*, 100*b*, and 100*c*, which may receive, demodulate the data packet. BD 100*a* may process the packet as a command or transmit the data to a subscriber if the packet is appropriately addressed to BD 100*a*. If the data packet is not appropriately addressed to BD 100*a*, BD 100*a* may ignore the packet.

Similarly, BD 100*b* may process the packet but typically will ignore the packet because backhaul point 10 typically will not transmit (address) data packets for reception by BD 100*b*.

BD 100*c* may process the packet as a command or transmit the data to a subscriber if the packet is appropriately addressed to BD 100*b*. In addition, if the destination address of the packet matches a destination in the routing table, BD 100*b* may re-address and retransmit (i.e., repeat) the data onto the MV power line in a second data packet embodied in a second signal. The second signal may traverse links L3 and L4 and be received by BDs 100*b* and 100*d*, which may receive and demodulate the data packet.

BDs 100*b* and 100*d* may process the packet as a command or transmit the data to a subscriber if the data packet is appropriately addressed. If the data packet is not appropriately addressed, BDs 100*b* and/or 100*d* may ignore the packet. In addition, if the destination address of the data packet matches a destination address in its routing table, BD 100*d* may re-address and retransmit (i.e., repeat) the data onto the MV power line in a third data packet embodied in a third signal, for reception of other BDs 100 further downstream (not shown).

This example embodiment may be useful in the event of localized noise in which BD 100*c* has better reception capabilities from backhaul point 10 than does BD 100*b*. In other words, due to noise or other circumstances, communications received by BD 100*b* from BD 100*c* may be received more reliably than those from backhaul point 10. BD 100*c* may be located at a less noisy, or quiet spot, which thereby permitting reliable communications with backhaul point 10 whereas the noise at BD 100*b* does not.

For upstream communications, BD 100*d* may transmit or repeat upstream data in a first upstream data packet, which may be received by BDs 100*c* and 100*b*. BD 100*b* may ignore the data packet while BD 100*c* may repeat the data for upstream reception by backhaul point 10. Similarly, BD 100*b* may transmit upstream data in a first upstream data packet, which may be received by BDs 100*a*, 100*c* and 100*d*. BD 100*d* and BD 100*a* may ignore the data packet while BD 100*c* may repeat the data for upstream reception by backhaul point 10. Alternately, BD 100*b* may transmit the data directly to BP 10 via Link L5 because, for example, localized noise typically does not hinder transmissions. In addition, in an alternate embodiment, any of the BDs 100 of FIG. 3*a* or 3*b*, or in other figure herein, may also alternately transmit directly to the BP 10, but might receive data via repeating BD 100.

Upon reception of a properly addressed upstream data packet, backhaul point 10 may transmit the data onto the backhaul link for eventual reception by AP 20.

Figure 4B:
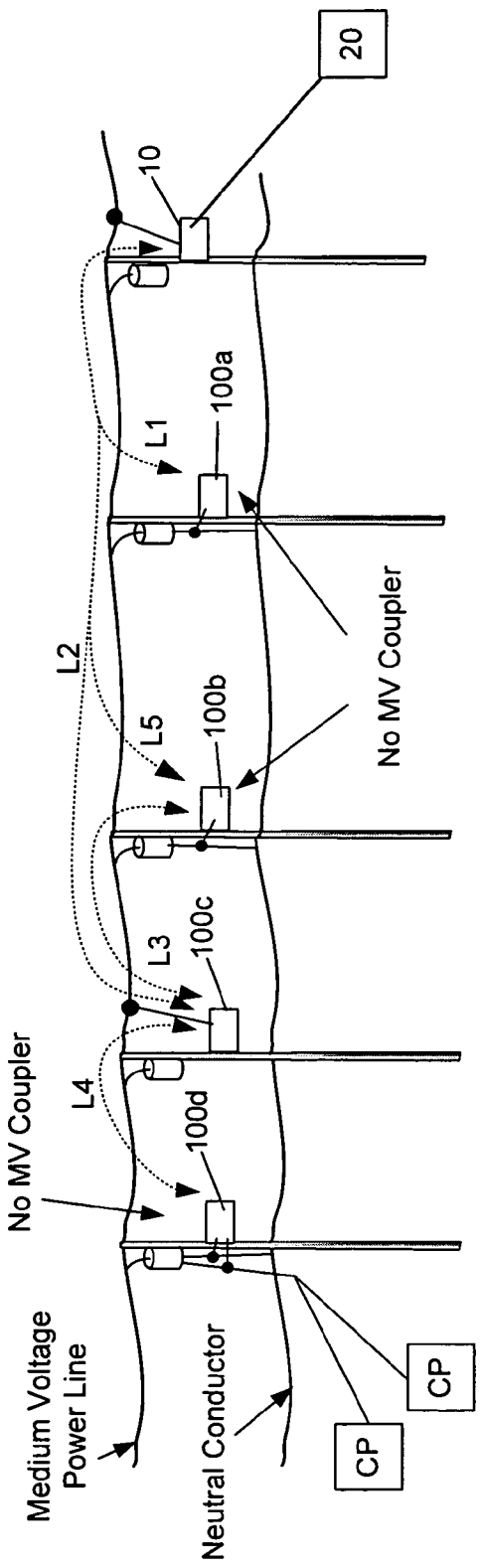

FIG. 4b illustrates a fourth example embodiment of the present invention. As will be evident to those skilled in the art, the data flow illustrated by FIG. 4b is substantially similar to that of FIG. 4a. As shown in FIG. 4b, however, BDs 100a, 100b, and 100d are not physically coupled to the medium voltage power line. In this embodiment, BDs 100a, 100b, and 100d may be communicatively coupled to the neutral conductor that extends down the utility pole from the distribution transformer and, preferably, above the horizontal neutral conductor that typically extends from pole to pole. An inductive coupler comprising a magnetically permeable toroid, with one or more windings, that clamps around the conductor may be used.

A "link budget" is a phrase sometimes used to indicate the amount of power necessary to provide a reliable communications link and is often measured in dBs. Various objects along the communications channel may use up a portion of the link budget such as, for example, the MV power line (e.g., which may dissipate 0.5-3 dB per one hundred feet), and the MV coupler of the receiving device.

It has been discovered that while the distribution transformers attenuate the data signals, they may not completely block the data signals from traveling through the distribution transformer from the MV power line to the neutral conductor connected to the transformer enclosure. Consequently, if the power of the data signal is of sufficient magnitude upon reaching the distribution transformer, the signals may travel from the MV power line through the distribution transformer (e.g., coupling from the primary to the secondary of the transformer and/or coupling to the transformer enclosure and neutral conductor via parasitic capacitances) and down the low voltage and/or neutral conductors connected to the distribution transformer with sufficient remaining energy to be received by the BD 100. In other words, in some instances, the distribution transformer simply may be considered another object that consumes the link budget. Thus, BDs 100a, 100b, and 100d may be communicatively coupled to the neutral conductor that extends down the utility pole and receive the data signals from the MV power line in such a manner. It will be noted that while BDs 100a, 100b, and 100d may not physically couple "around" the distribution transformer, for purposes of this specification they are referred to as bypass devices because they facilitate the data passing the distribution transformer to the customer premises.

However, if a signal is sufficiently attenuated prior to reaching the distribution transformer, the transformer may further attenuate the signal to the noise floor (i.e., using up the remaining link budge) in which case the BD 100 may not reliably receive the signals on the neutral or LV conductors. Consequently, the system of FIG. 4b has been designed so that BDs 100a, 100b, and 100d are all located at a transformer that is adjacent to a transformer co-located with a BD 100c or BP 10 that is coupled to the MV power line via a MV coupler. Thus, the close proximity of the BD 100d and BD 100b to BD 100c, and the close proximity of BD 100a to backhaul point 10 result in less attenuation of the data signals via their transmission over the MV power line (for both upstream and downstream communications). Because there is less attenuation of the data signals via the MV power line over these communication channels, there is a greater link budget (power or SNR) remaining than what might be available should the signals have traversed longer MV links. In this embodiment, the close proximity, and associated lower MV power line attenuation, allow for enough remaining link budget for the data signals to travel through the distribution transformers (for both upstream and downstream communications). Alternately, any or all of the BDs 100 may be coupled to one or both LV energized conductors instead of, or in addition to, the neutral conductor for communicating via the MV power line. Thus, such BDs 100 might communicate in a first frequency band over the MV power line and a second frequency band over the LV power lines to the one or more user devices. In addition, it may be desirable to transmit data signals at a first (e.g., higher) power level when transmitting via a MV coupler onto the MV power line and to transmit data signals at a second (lower) power level when transmitting via the LV power line or neutral conductor to the MV power line.

The ability to connect to the neutral conductor (or alternately to the energized LV conductor(s)) eliminates the need for an MV coupler at each BD 100, which may significantly reduce the cost of the equipment and installation of the system. In an alternate embodiment, every BD 100, or every BD 100 and the BP 100, may be coupled to the LV conductor(s) or neutral conductor extending vertically down from the distribution transformer and the data paths may be substantially similar to or identical to the data paths shown in FIG. 3a.

FIG. 5a illustrates another example embodiment of the present invention. As will be evident to those skilled in the art, the data flow illustrated by FIG. 5a is substantially similar to that of FIG. 3b. As shown in FIG. 5a, however, BDs 100a and 100c are not coupled to the MV power line and, therefore, do not include medium voltage couplers. In this embodiment, BDs 100a and 100d may be communicatively coupled to the neutral conductor that extends down the utility pole from the distribution transformer and preferably above the horizontal neutral conductor that typically extends from pole to pole. Alternately, either or both of BDs 100a and 100d may be communicatively coupled to one or both LV energized conductors instead of, or in addition to, being coupled to the neutral conductor.

FIG. 5b illustrates still another example embodiment of the present invention. As will be evident to those skilled in the art, the data flow illustrated by FIG. 5b is similar to that of FIG. 3b except that the data is communicated over the neutral conductor instead of the MV power line. In this embodiment, the backhaul point 10 and the BDs 100 may be communicatively coupled to the horizontal neutral conductor that typically extends from pole to pole. Thus, this system may alleviate the need to employ medium voltage couplers altogether and instead employ a neutral coupler (if necessary) at each network element.

Figure 6:
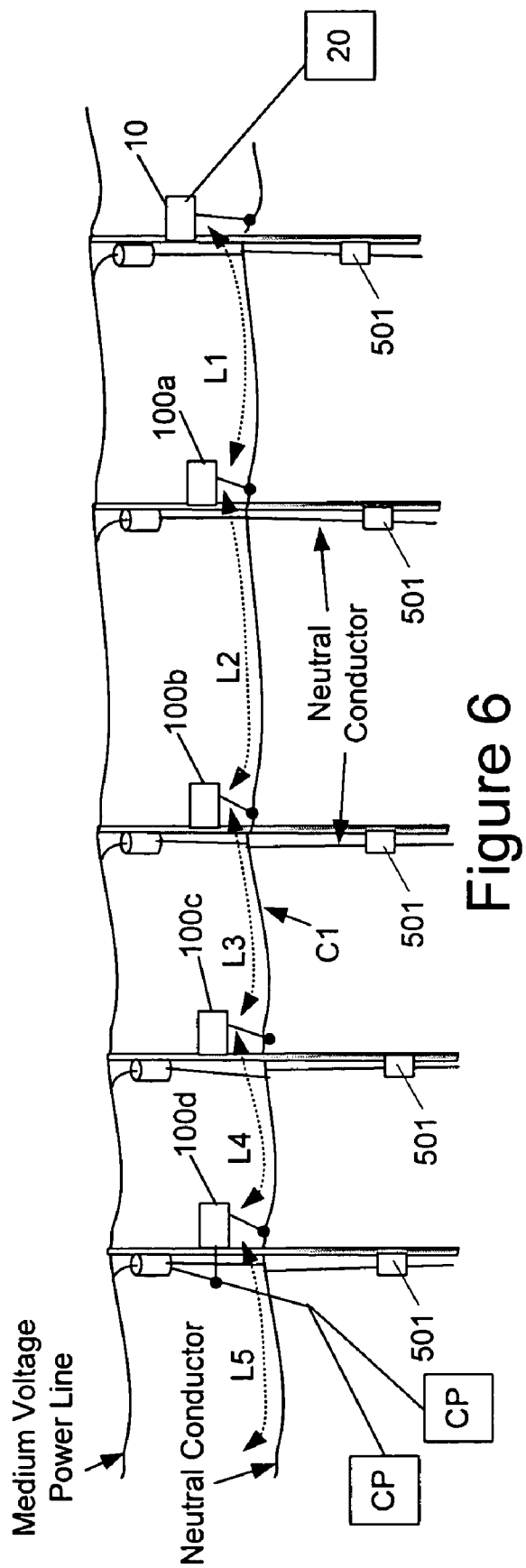
FIG. 6 is a schematic representation of a portion of an example power line communications system in accordance with another example embodiment of the present invention.

FIG. 6 illustrates a another example embodiment of the present invention. As will be evident to those skilled in the art, the data flow illustrated by FIG. 6 is similar to that of FIG. 3a except that the data is communicated over the neutral conductor instead of the MV power line. In this embodiment, the backhaul point 10 and the BDs 100 may be communicatively coupled to the horizontal neutral conductor that typically extends from pole to pole. Thus, this system also may alleviate the need to employ medium voltage couplers altogether and instead employ a neutral coupler (if necessary) at each network element.

As shown in FIGS. 5a-b and 6, the neutral conductor may be connected to ground at the utility poles. As will be evident to those skilled in the art, the grounded neutral conductor at the utility pole may attenuate (or ground) the data signals. Consequently, in some instances, it may be desirable to install a data impedance 501 on the neutral conductor that extends from the horizontal neutral conductor to ground. The data impedance may be a low pass filter formed of ferrite toroids that impedes (or reduces) the amount of the energy of the data signals that is conducted to ground thereby permitting more of the data signal energy to remain on the horizontal neutral conductor to be detected by the BDs 100 and backhaul point 10.

As discussed, the BP 10 and BDs 100 of the disclosed embodiments may be remotely configurable via commands communicated over the PLCS (e.g., via the MV power line and/or neutral conductor) from the PLS. Consequently, the present invention may dynamically change between topologies of various embodiments. For example, in response to one or more commands from the PLS, the devices configured to communicate via the embodiment of FIG. 3a may be remotely reconfigured to communicate via the embodiment of FIG. 3b and vice versa. Similarly, the devices configured to communicate via the embodiment FIG. 5b may be remotely reconfigured to communicate via the embodiment of FIG. 6 and vice versa.

The figures herein depict only a single MV power line. However, electrical distribution systems often have two or three MV power line conductors running in parallel. It has been discovered that high frequency data signals may cross-couple between MV power line conductors. Thus, in some instances, a data signal transmitted on a first MV power line conductor may be received on a second MV power line conductor. Thus, in practice, any of the embodiments disclosed herein may employ one, two, or three power line MV conductors and/or one or more neutral conductors. For example, some of the BDs 100 communicating with a first BP 10 may be coupled to a first MV conductor, others may be coupled to a second MV conductor, and others and/or the BP 10 may be coupled to a third MV conductor. Thus, for example, data may be transmitted from a BD 100 coupled to a first MV conductor, received and repeated by a BD 100 coupled to a second MV conductor, received and repeated by a BD 100 coupled to a third MV conductor, received and repeated by a BD 100 coupled to a neutral conductor, and subsequently received by a BD 100 or BP 10 coupled to the first MV conductor. In addition or alternately, each set of BDs 100 coupled to each MV conductor or neutral may employ a different embodiment. For example, BDs 100 coupled to a first MV conductor may employ the embodiment and data flow depicted in FIG. 3b, BDs 100 coupled to a second MV conductor (which may or may not run parallel to the first conductor) may employ the embodiment and data flow depicted in FIG. 4b, and BDs 100 coupled to a neutral conductor may employ the embodiment and data flow depicted in FIG. 6.

Any suitable type of data signal may communicated via each embodiment or over each link. For example, for conductive signals any suitable signal modulation used in communications (Code Division Multiple Access (CDMA), Time Division Multiple Access (TDMA), Frequency Division Multiplex (FDM), Orthogonal Frequency Division Multiplex (OFDM), and the like), and IEEE 802.11 (a, b, or g) signal set, and/or IEEE 802.16 (e.g., WIMAX which may be OFDM) signal set may be used. OFDM (including WIMAX) may be used for any or all of communications via the LV power lines, MV power lines, and/or neutral conductor. Use of a WIMAX signal, HomePlug or other signal described herein may require frequency shifting the signal to the desired frequency band. A modulation scheme producing a wideband signal such as CDMA or OFDM that is relatively flat in the spectral domain may be used to reduce radiated interference to other systems while still delivering high data communication rates.

Furthermore, each link in the embodiments (e.g., L1, L2, L3, and L4) may be orthogonal to any or all of the other links. For example, referring to FIG. 3a, Link L1 may use a first frequency band, Link L2 may use a second frequency band, Link L3 may use a third frequency band, wherein all of the frequency bands may different so as not to interfere with each other. Link L4 also might use the first frequency band because, as discussed above, the devices using the first frequency may be sufficiently far apart so that the signals attenuate between those sections thereby allowing for reuse of the frequency band and simultaneous communications in that frequency at different sections of the MV power line or neutral conductor. As another example of orthogonal links, referring to FIG. 3a, Link L1 may use an OFDM signal, Link L2 may use a surface wave signal, Link L3 may use a UWB signal so that all of the signals do not interfere with each other. Alternately, any or all of the links may include multiple signals. For example, any of the links may include a first signal type, such as a conventional frequency band conductive signal (e.g., an OFDM signal), and also may include one or more other signal types orthogonal to the first signal type, such as UWB and/or surface wave signals.

In addition, instead of using OFDM signals on the MV power lines, LV power lines, or neutral conductors, an alternate embodiment of a PLCS system may use ultra wideband signals or surface wave signals (Goubau waves) to provide communications. In those embodiments in which include BDs 100 or a BP 10 coupled to the MV conductor, it may be desirable to couple the device to the connecting conductor that connects the MV power line conductor to the distribution transformer via, for example, an inductive coupler. By coupling the device to the connecting conductor—instead of series connecting the couplers to the MV power line conductor—the system may have less through loss due to the coupler installations. Finally, while the embodiments described herein include coupling and transmitting on the MV power line conductors and/or neutral conductor, in practice energy from the transmission may couple to other conductors or may traverse a return path that includes other conductors. For example, signals transmitted on a first power line conductor may cross couple to other power line conductors and/or the neutral conductor. Similarly, signals transmitted on a first power line conductor may travel a return path that includes another power line conductor and/or the neutral conductor. In some instances, it may be desirable to transmit (and receive) the signals on two MV or LV conductors differentially. Thus, for a differential MV transmission (i.e., differential on two MV conductors or one MV conductor and the neutral) of data signals (e.g., of a conductive signals such as a UWB, WIMAX, HomePlug, or other OFDM signal), the transmitting device may include two couplers to transmit substantially equal, but opposite in polarity, signals onto the two MV overhead conductors. The receiving device may include one or two couplers. Similarly, the LV transmissions may be transmitted differentially onto two energized conductors and may be a UWB signal, an OFDM signal, a WIMAX signal, or other signal. Finally, the backhaul link may be any suitable medium including a digital subscriber line (DSL), a coaxial cable (e.g., DOOSIS), and/or a WIMAX or other wireless link.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A power line communications system for communicating data over one or more overhead power line conductors to one or more user devices, comprising:
    a backhaul device communicatively coupled to the one or more power lines conductors and to a backhaul link;
    a plurality of communications devices, wherein each of said plurality of communications devices is communicatively coupled to the one or more power line conductors and to at least one user device;
    wherein a first communications device is in direct communication with said backhaul device through the one or more power line conductors and is configured to transmit data received from said backhaul device onto the one or more power line conductors to a second communications device and a third communications device; and
    wherein said first communications device is configured to transmit at least some data received from said backhaul device to one or more user devices.

2. The system of claim 1, wherein said third communications device is communicatively coupled to the one or more power line conductors between said backhaul device and said first communications device.

3. The system of claim 1, wherein said first communications device is communicatively coupled to the one or more power line conductors between said backhaul device and said second communications device.

4. The system of claim 1, wherein said backhaul device is communicatively coupled to a first medium voltage power line conductor of the one or more power line conductors.

5. The system of claim 4, wherein said second communications device is communicatively coupled to a second medium voltage power line conductor of the one or more power line conductors.

6. The system of claim 4, wherein said first communications device is communicatively coupled to a second medium voltage power line conductor of the one or more power line conductors.

7. The system of claim 4, wherein said second communications device is communicatively coupled to a neutral conductor of the one or more power line conductors.

8. The system of claim 1, wherein said second communications device is communicatively coupled to the one or more power line conductors by being coupled to a neutral conductor electrically connected to a distribution transformer that is connected to the one or more power line conductors.

9. The system of claim 1, wherein
    said second communications device is in communication with said backhaul device through the one or more power line conductors via said first communications device; and
    wherein said third communications device is in communication with said backhaul device through the one or more power line conductors via said first communications device.

10. The system of claim 1, wherein said second communications device is communicatively coupled to the one or more power line conductors by being coupled to a low voltage power line conductor electrically connected to a distribution transformer that is connected to the one or more power line conductors.

11. The system of claim 1, wherein said backhaul device, said first communications device, second communications device, and said third communications device are each coupled to a neutral conductor of the one or more power line conductors.

12. The system of claim 11, wherein communications transmitted from said first communications device, said second communications device, and said third communications device to said backhaul device traverse the neutral conductor at least in part.

13. The system of claim 1, wherein
    said first communications device is in communication with said backhaul device via a first link;
    said second communications device is in communications with first communications device via a second link; and
    wherein said first link and said second link are orthogonal to each other.

14. The system of claim 1, wherein said second communications device is capable of being remotely configured via a command communicated through the one or more power line conductors to repeat data for said third communications device.

15. The system of claim 1, where at least one of said plurality of communications devices is coupled to a medium voltage power line conductor of the one or more power line conductors and at least one of said plurality of communications devices is coupled to a neutral conductor of the one or more power line conductors.

16. A method of providing communications over one or more overhead power line conductors to one or more user devices, comprising:
    receiving first data in a first data packet via the one or more power line conductors from a first communications device;
    determining whether said first data is to be repeated;
    transmitting said first data onto the one or more power line conductors if said first data is to be repeated;
    receiving a second data via the one or more power line conductors from a second communications device;
    determining whether said second data is to be repeated;
    transmitting said second data onto the one or more power line conductors if said second data is to be repeated;
    receiving a third data via the one or more power line conductors from a backhaul device communicatively coupled to a backhaul link;
    determining whether said third data is to be repeated;
    transmitting said third data onto the one or more power line conductors if said third data is to be repeated;
    determining whether said third data is to be transmitted to a user device; and
    transmitting said third data to a user device if said third data is to be transmitted to a user device.

17. The method of claim 16, further comprising:
    determining whether said third data is to be processed as a command; and
    processing said third data as a command if said third data is to be processed as a command.

18. The method of claim 16, wherein said transmitting of the first data, the second data, and the third data onto the one or more power line conductors comprises transmitting the first data, the second data, and the third data onto a neutral conductor of the one or more power line conductors.

19. The method of claim 16, wherein said transmitting of the first data employs transmitting the first data in a first frequency band and transmitting of the second data includes transmitting of the second data in a second frequency band.

20. The method of claim 16, wherein said transmitting of the first data, the second data, and the third data onto the one or more power line conductors further comprises transmitting the first data, the second data, and the third data via a conductive signal.

21. The method of claim 20, wherein the conductive signal comprises an ultra wide band signal.

22. The method of claim 20, wherein at least one of said conductive signals comprises an orthogonal frequency division multiplexed signal.

23. The method of claim 16, wherein said transmitting of the first data, the second data, and the third data onto the one or more power line conductors comprises transmitting the first data, the second data, and the third data via surface wave signals.

24. The method of claim 16, wherein said transmitting of the first data, the second data, and the third data onto the one or more power line conductors comprises transmitting the first data, the second data, and the third data via a WIMAX signal set.

25. A method of providing power line communications to communicate data over one or more overhead power line conductors to one or more user devices, comprising:
communicatively coupling a backhaul device to the one or more power line conductors and to a backhaul link;
communicatively coupling a plurality of communications devices to the one or more power line conductors and to at least one user device, wherein each of the plurality of communications devices is in communication with said backhaul device;
transmitting a first data packet over the one or more power line conductors from a first of the plurality of communications devices and wherein the first data packet is in a first signal having one or more carriers in a first frequency band;
transmitting a second data packet over the one or more power line conductors from a second of the plurality of communications devices and wherein said second data packet is in a second signal having one or more carriers at one or more of the same frequencies as said first signal; and
wherein the first signal and the second signal are transmitted during overlapping time periods and do not interfere with the reception of each other at the devices to which the first and second data packets are addressed.

26. The method of claim 25, wherein the backhaul device is coupled to a first power line conductor and the first of the plurality of communications device is coupled to a second power line conductor.

27. The method of claim 25, wherein the first and second communications devices are coupled to a neutral conductor of the one or more power line conductors.

28. The method of claim 25, wherein the first data packet is addressed to a third communications device that repeats the data of the first data packet onto the one or more power line conductors.

29. The method of claim 28, wherein the second data packet is addressed to the backhaul device.

30. The method of claim 28, wherein the second data packet is addressed to a fourth communications device that repeats the data of the second data packet onto the one or more power line conductors.

31. The method of claim 25, wherein the first of the plurality of communications devices and the second of the plurality of communications devices are coupled to the same power line conductor.

32. The method of claim 25, wherein the first of the plurality of communications devices and the second of the plurality of communications devices are coupled to different power line conductors.

33. A power line communications system for communicating data to one or more user devices over an electrical power distribution network having one or more overhead medium voltage power line conductors, a neutral conductor, and at least one distribution transformer coupled to one of the medium voltage power line conductors, comprising:
a backhaul device communicatively coupled to one of the one or more medium power line conductors and to a backhaul link;
a first communications device coupled to the neutral conductor and in communication with at least one user device; and
wherein said first communications device is in communication with said backhaul device via the neutral conductor and the medium voltage power line.

34. The system of claim 33, wherein the neutral conductor includes a horizontal neutral and a neutral connecting conductor connecting the distribution transformer to the horizontal neutral conductor and wherein said first communications device is coupled to said neutral connecting conductor.

35. The system of claim 33, wherein the electrical power distribution network includes a ground conductor connecting the horizontal neutral conductor to ground, the system further comprising:
a data impedance coupled to the ground conductor.

36. The system of claim 33, further comprising:
a second communications device coupled to the neutral conductor and in communication with at least one user device; and
wherein said second communications device is in communication with said backhaul device via the neutral conductor and the medium voltage power line.

* * * * *